United States Patent [19]

Massara

[11] 4,244,854

[45] Jan. 13, 1981

[54] ELASTOMER-BASED MASTER BATCH

[76] Inventor: Giacinto V. Massara, Via Carpaccio 3, Milan, Italy

[21] Appl. No.: 23,151

[22] Filed: Mar. 23, 1979

[30] Foreign Application Priority Data

Apr. 3, 1978 [IT] Italy ............................... 21911 A/78

[51] Int. Cl.³ ............................................... C08K 5/01
[52] U.S. Cl. ...................... 260/33.6 A; 260/33.6 UA;
260/33.6 PQ; 260/42.56; 260/3.5; 526/281;
260/3; 260/5; 260/45.8 SN
[58] Field of Search ............. 260/42.56, 33.6, 33.6 A,
260/33.6 UA, 33.6 PQ, 3, 3.5, 5, 45.8 SN;
526/281

[56] References Cited

U.S. PATENT DOCUMENTS

| 2,799,668 | 7/1957 | Anderson | 526/281 X |
| 2,932,630 | 4/1960 | Robinson et al. | 526/281 X |
| 3,035,008 | 5/1962 | Gaylord | 260/42.56 X |
| 3,226,353 | 12/1965 | Engle | 260/42.56 X |

*Primary Examiner*—Melvyn I. Marquis
*Attorney, Agent, or Firm*—Bucknam and Archer

[57] ABSTRACT

A master batch used in the first stage of the production of elastomeric products which comprises a base of elastomeric material and one or more auxiliary components such as antioxidants, plasticizers, blowing agent and the like. The elastomeric base comprises an elastomeric polymer of a terpenic bicyclic monoethylenically unsaturated hydrocarbon, preferably norbornene.

8 Claims, No Drawings

ELASTOMER-BASED MASTER BATCH

This invention relates to a master batch comprising an elastomer base and at least one auxiliary component.

It is known that the first stage in the preparation of products based on natural or synthetic elastomers, thermostable, thermoplastic or thermosetting polymers, simple or complex, consists of the preparation of mixtures (hereinafter referred to as "final mixes") comprising an elastomeric base into which auxiliary charges are suitable and homogeneously dispersed.

Hereinafter the word "polymer" will be used also as referred to an elastomer.

The various auxiliary components can be divided into the following categories:

1. Vulcanization or polymerization accelerators;
2. Vulcanization or polymerization activators;
3. Anti-ageing agents, antioxidants and stabilizers in general;
4. Active, semiactive or exipient fillers of light or dark colour;
5. Solid, semisolid or liquid plasticizers of light or dark colour;
6. Miscellaneous auxiliaries such as colourants, blowing agents, anti-adhesives agents, abrasives etc.; and
7. Vulcanizers such as sulphur or other donor products or polymerizers in general.

In preparing the final batches, great difficulties are usually encountered, connected with one or more of the following factors:

(a) Weighing errors in weighing the components of the aforesaid categories, in particular those of categories 1, 2, 3, 6 and 7, where the quantities to be metered are very small and any errors thus assume great importance;

(b) Allergic or dermatitis effects caused by contact between the ingredients and the skin of the persons carrying out the mixing;

(c) The difficulty in dispersing the components which for various reasons may remain as agglomerates (granules) even when an attempt is made to disperse them homogeneously in the polymer base, or may require long processing times. These long processing times are obviously costly, and in addition can and usually do lead to large deterioration in the physical and mechanical characteristics of the compounds.

An attempt has been made to solve the aforesaid problems by preparing master batches in which natural rubber or the like is used as an elastomer base. However, in this case, the quantity of auxiliaries components which can be introduced into the elastomer base is always very low. In addition, the master batches obtained in this manner have the defect of poor dispersion in the polymer with which they are required to form the final compound, in that very often its viscosity is different from said polymer or from the mix being processed. Moreover, a natural rubber base is not suitable for all uses, for example when working with final compounds of high solvent resistance.

Another further unsatisfactory attempt to overcome the aforesaid problems consists of preparing dispersions or pre-dispersions of powder or paste bases. In most cases these are powder dispersions made using dispersing oils. However, these have the disadvantage that the components of greater specific gravity tend to settle out if the dispersing substance is not completely suitable, or if its quantity is insufficient.

It is therefore apparent that for some time there has been a need to provide master batches which do not have the aforesaid problems, and in particular master batches which allow rapid homogeneous dispersion of the auxiliary components. There is also a need for master batches into which a high quantity of auxiliary components can be introduced, without a lengthy mixing time being required. It is apparent that if available, master batches of such characteristics would enable the errors in weighing the auxiliary components to be reduced, would be less harmful, and the final compounds would not appreciably degrade chemically or mechanically because of the shorter and more economical mixing time.

The aforesaid problems can be resolved with a master batch according to the present invention comprising a base of elastomeric material and at least one auxiliary component which is a vulcanization or polymerization activator or accelerator, an anti-ageing agent, an antioxidant, a stabilizer, an exipient, a plasticizer, a blowing agent, an anti-adhesive agent, a sulphur-based vulcanizer, or a like component, wherein the said base comprises an elastomer polymer of a monoethylenically-unsaturated bicyclic terpene hydrocarbon.

The monoethylenically unsaturated bicyclic terpene hydrocarbon is a bicyclic hydrocarbon monomer containing the bicyclic ring structure of thujane, carane, pinane or camphane, with one ethylenic unsaturation and polymerizable by ring-opening.

It has been found that particularly favourable results can be obtained when said elastomer polymer is poly(1,3-cyclopentylenevinylene), more commonly known as "polynorbornene".

It is well known that polynorbornene is produced by polymerization, by opening the ring of norbornene (or bicyclo-(2,2,1) heptene-2) in accordance with the reaction scheme

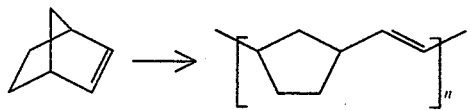

with norbornene generally being produced by the Diels-Alder condensation of ethylene and cyclopentadiene. The synthesis both of norbornene and of polynorbornene are well known technically, and are therefore not further discussed herein.

It has been found that particularly favourable master batches can be obtained by using polynorbornene which has an average molecular weight greater than $2 \times 10^6$. By way of nonlimiting example the average molecular weight can be between $2.5 \times 10^6$ and $4 \times 10^6$.

The particularly favourable results which can be attained using the present invention reside in the surprising and unforeseeable fact that the presence as the elastomer base in the master batch of the polymer as previously defined, in particular polynorbornene, enables a quantity of auxiliary components to be introduced into the master batch at a level absolutely unattainable with any of the other, presently-known elastomers.

This quantity, which obviously depends on the chemical-physical nature of the component or components to be introduced, is typically at least 8 parts by weight, and can reach 10 parts by weight of component(s) per part by weight of polymer, especially if the polymer is polynorbornene.

Thus the present invention embraces master batches which are characterised by comprising polynorbornene and at least one auxiliary component in such quantities that the weight ratio of polynorbornene to the one or more auxiliary component is 1 part by weight of polynorbornene to 8–10 parts by weight of components.

It has also been found that by using polynorbornene as the elastomeric base in the master batch, a high quantity of auxiliary dispersing agent can be introduced into the master batch, varying from about 1 to 150 parts by weight per 100 parts by weight of polynorbornene.

Consequently the present invention also embraces the previously defined polynorbornene master batches characterised by further comprising about 1 to 150 parts by weight of dispersing agent per 100 parts by weight of polynorbornene.

The preferred master batches of the present invention have the following typical composition:

| Polynorbornene | 100 parts by weight |
|---|---|
| Dispersing agent | 1 to 150 parts by weight |
| Auxiliary component(s) to be dispersed | 800 to 1000 parts by weight |

The high absorbent capacity of polynorbornene is evident, as are the wide range of variability and the high absorbent capacity of the auxiliary dispersing agents; the absolute quantity of auxiliary dispersing agents being linked to the physical, morphological and dispersability characteristics of the component to be dispersed.

Polynorbornene is compatible with virtually all elastomers and polymers and is resistant to solvents and to oils, and the polynorbornene elastomer base need be present only in a very small quantity in the final compounds in which one or more master batches are to be used. This is because in the majority of cases it is possible to use the present master batches in the same quantity one would have originally used the auxiliary component(s): careful experiments have shown that with the preferred master batches of the invention, it is possible to obtain dispersions which are so perfect and intimate as to allow a reduction in the quantity of product to be introduced, this reduction amply allowing for the quantity of polynorbornene carrier and auxiliary dispersing agent used in their preparation.

The master batches of the present invention can be prepared by the usual procedures well known to the expert in the elastomer material field, and are therefore not discussed in detail. For example, the batches are prepared using normal open roller mills, or closed mills, with or without a piston. Finally, the batches can also be prepared in the form of dry blends.

The following non-limiting Examples further illustrate the master batches of the present invention. Comparison Examples are also given. The parts are parts by weight.

EXAMPLE 1

A master batch was prepared having the following composition:

| Polynorbornene (NORSOREX ®, produced by Charbonage de France Chimie) | 100 parts |
|---|---|
| Naphthenic oil (AR 030, produced by Massara S.p.A.) | 95 parts |
| Dispersing agent (GR 667, produced by Grace Italiana) | 5 parts |
| Vulcanizing agent (SANTOCURE, produced by Monsanto) | 800 parts |

The components were mixed in a roller mill at a mixing temperature of 70° C.

After 15 minutes of mixing, the batch was already perfectly homogeneous and the fillers perfectly distributed, as was observed both by a first visual examination and by microscopic analysis. GR 667 is a combination of particular esters of fatty acids. Santocure is N-cyclohexyl-2-benzothiazol-sulfenamide.

Comparison Example 1

The procedure of Example 1 was followed, but replacing the polynorbornene by an equal quantity of natural rubber. After more than one hour of mixing, the test was interrupted because of the evident impossibility of homogenizing the vulcanizing agent with the other components of the batch.

The test was repeated with progressively decreasing quantities of vulcanizing agent, and it was found that the vulcanizing agent had to be reduced to only 300 parts to obtain a homogeneous batch.

EXAMPLE 2

Using the operating conditions of Example 1, a master batch was prepared having the following composition:

| Polynorbornene (NORSOREX ®, produced by Charbonage de France Chimie) | 100 parts |
|---|---|
| Napthenic oil (AR 030, produced by Massara S.p.A.) | 95 parts |
| Dispersing agent (GR 667, produced by Grace Italiana) | 5 parts |
| Vulcanizing inhibitor (SANTOGARD P.V.I., produced by Monsanto) | 400 parts |
| Excipient filler (CRAITAL 20, produced by Umbria Mineraria) | 400 parts |

In this case the batch was again perfectly homogeneous on microscopic examination after about 15 minutes of processing in the roller mill.

Comparison Example 2

The procedure of Example 2 was followed, but replacing the polynorbornene by an equal quantity of natural rubber. After more than one hour of mixing, the test was interrupted because of the evident impossibility of homogenizing the vulcanization inhibitor and excipient filler with the other components of the batch.

Repeating the test with progressively decreasing quantities of inhibitor and excipient, it was found that the inhibitor had to be reduced to only 200 parts and the excipient to only 200 parts to obtain a homogeneous batch.

EXAMPLE 3

Using the operating conditions of Example 1, a master batch was prepared having the following composition:

| | |
|---|---|
| Polynorbornene (NORSOREX ®, produced by Charbonage de France Chimie) | 100 parts |
| Naphthenic oil (AR 030, produced by Massara S.p.A) | 95 parts |
| Dispersing agent (GR 667, produced by Grace Italiana) | 5 parts |
| Zinc oxide | 1000 parts |

Again in this case, the batch was perfectly homogeneous on microscopic examination after about 18 minutes of processing in the roller mill.

Reference Example 3

The procedure of Example 3 was followed, but replacing the polynorbornene by an equal quantity of natural rubber. After about one hour of mixing, the test was interrupted because of the evident impossibility of homogenizing the zinc oxide with the other components of the batch.

Repeating the test with progressively decreasing quantities of zinc oxide, it was found that the zinc oxide had to be reduced to only about 400 parts to obtain a homogeneous batch.

Summarising, the master batches of the present invention as illustrated in the Examples, have the following advantages:

1. The introduction of very high quantities of auxiliary components of varied type (typically a minimum of 8 parts of components to 1 part of elastomer.

2. The further introduction of auxiliary dispersing agents which are capable of allowing not only optimum dispersion of the components in the master batch, but also of ensuring optimum dispersability of the master batches in the final batches for which the master batches are intended.

3. Perfect dispersion of the components, not only because of the presence of the auxiliary agent or agents, but also because of a further characteristic of the polynorbornene, namely that of being very rigid at ambiente temperature but of very rapidly becoming very fluid at a relatively low temperature, of the order of 50°–60° C.

4. The applicability of the master batches in all types of final compounds, whatever the basic polymer of these latter. This is because the polynorbornene is itself resistant to oil, and consequently its presence does not limit the chemical resistance of the final batches into which it is introduced. Consequently, polynorbornene is compatible with all types of polymer.

I claim:

1. A master batch comprising an elastomeric material base and at least one auxiliary component in the amount of at least 8 parts per part of elastomeric material, wherein the said base comprises an elastomer or polymer of a monoethylenically unsaturated bicyclic terpene hydrocarbon which contains the ring structure of thujane, carane, pinane or camphane and polymerizable by ring-opening.

2. A master batch as claimed in claim 1, which contains at least one auxiliary component which is a vulcanization or polymerization activator or accelerator, an anti-ageing agent, an antioxidant, a stabilizer, an excipient, a plasticizer, a blowing agent, an anti-adhesive agent, or a sulphur-based vulcanizer.

3. A master batch as claimed in claim 2, wherein said elastomer polymer is polynorbornene.

4. A master batch as claimed in claim 3, wherein the polynorbornene has an average molecular weight greater than $2 \times 10^6$.

5. A master batch as claimed in claim 4, wherein the polynorbornene has an average molecular weight of $2.5 \times 10^6$ to $4 \times 10^6$.

6. A master batch as claimed in claim 3, wherein the weight ratio of the polynorbornene to the filler is at least 1:8.

7. A master batch as claimed in claim 3, which further comprises 1 to 150 parts of auxiliary dispersing agent per 100 parts of polynorbornene.

8. A master batch according to claim 2 which consists of 100 parts of polynorbornene, 1–150 parts of dispersing agent and 800–1000 parts by weight of said at least one auxiliary component.

* * * * *